J. V. MAXWELL AND J. P. SEISER.
TRUSSED HOLLOW SPAR.
APPLICATION FILED JAN. 14, 1921.
1,400,620.
Patented Dec. 20, 1921.
Fig. 1.
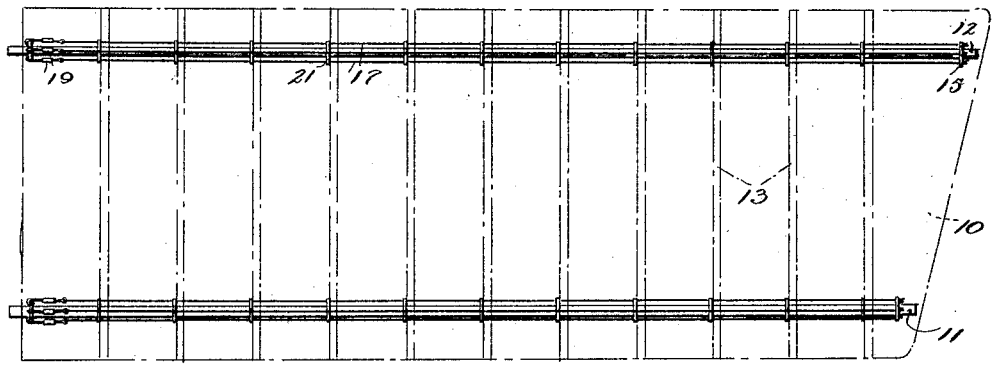
Fig. 3.
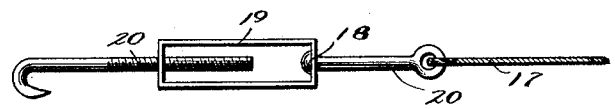
Fig. 2.
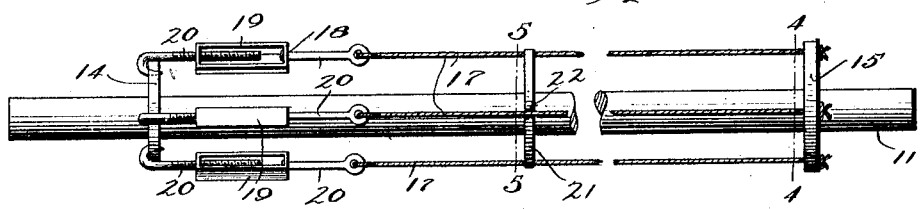
Fig. 4.     Fig. 5.     Fig. 6.
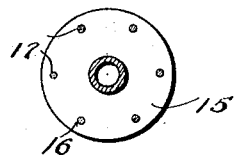 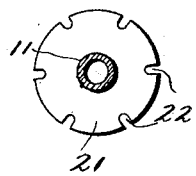 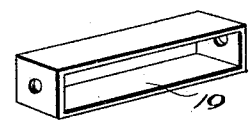
WITNESSES
INVENTOR
J. P. Seiser,
J. V. Maxwell,
BY
ATTORNEYS

UNITED STATES PATENT OFFICE.

JAMES VICTOR MAXWELL AND JOSEPH PAUL SEISER, OF WHITE PLAINS, NEW YORK; SAID SEISER ASSIGNOR TO SAID MAXWELL.

TRUSSED HOLLOW SPAR.

1,400,620.     Specification of Letters Patent.     Patented Dec. 20, 1921.

Application filed January 14, 1921. Serial No. 437,233.

*To all whom it may concern:*

Be it known that we, JAMES VICTOR MAXWELL and JOSEPH PAUL SEISER, citizens of the United States, and residents of White Plains, in the county of Westchester and State of New York, have invented certain new and useful Improvements in Trussed Hollow Spars, of which the following is a specification.

Our present invention relates generally to trussed hollow bars or tubes, and more particularly to the spars of aeroplane wings, our object being the provision of a trussed hollow beam particularly applicable to aeroplane construction although capable of use in other structures where a strong light spar capable of resisting severe bending strains is desirable.

In the accompanying drawing illustrating our present invention and forming a part of this specification, Figure 1 is a top plan view of an aeroplane wing illustrating the practical application of our invention, Fig. 2 is an enlarged plan view of one of the spars proposed by our invention, partly broken away, Fig. 3 is an enlarged side view of certain of the truss members or connections, Figs. 4 and 5 are cross sections taken respectively on lines 4—4 and 5—5 of Fig. 2, and Fig. 6 is a detail perspective view of the turnbuckle frame.

Referring now to these figures, it is well known that for the purpose of economy in weight, it is desirable particularly in the construction of aeroplane wings, one of which is seen generally in dotted lines at 10 in Fig. 1, that the lengthwise spars 11 and 12 be in the nature of hollow beams or tubes, usually extending through openings in the several cross ribs 13 of the wing structure.

In seeking to strengthen these hollow spars so as to enable the same to successfully resist bending strains to which they are subjected in use, we propose a truss arrangement which, though capable of general application to hollow spars for purposes of added strength, is especially applicable to aeroplane construction, and includes a pair of head plates 14 and 15, securely fastened to the external surface of the spars 11 and 12 adjacent to the opposite ends thereof. This connection of the head plates 14 and 15 may be accomplished by shrinking, brazing, welding and in fact any form of connection which will rigidly secure these head plates and adapt the same to constitute anchors for the truss connections.

Each of the head plates has an annular series of apertures 16 to receive the ends of flexible truss connections 17 disposed in an annular series around and spaced from the spar, and in the form of cables or the like having interposed therein turnbuckles generally indicated at 18 and including swiveled frames 19 and turnbuckle rods 20. These truss connections are supported intermediate the head plates 14 and 15 forming their end anchors, by spacing members 21 which form the struts of the truss arrangement and have peripheral series of recesses or notches 22 receiving the truss cables. These spacing or strut plates are slidably disposed on the spars at spaced intervals and in a lengthwise series between the head plates 14 and 15 so that they may be readily shifted to adjust the same to the particular spacing of the cross ribs 13 of a wing structure, it being especially desirable that for the purpose of maximum strength one of the strut or spacing plates shall in practice be located immediately adjacent to one of the cross ribs as generally seen in Fig. 1 and thus at points where the maximum bending strains are thrown against the spars.

Thus with the ends of the spars secured in any suitable manner to the wing ends and with the struts or spacing plates thereof adjusted to positions immediately to one side of the several wing ribs, our invention provides for a spar of great strength, which will be light in weight and yet capable of successfully resisting bending strains far in excess of those which can be successfully combated in the structures now in common use.

We claim:

1. In an aeroplane wing structure, the combination with the cross ribs, of lengthwise spars and truss means for the spars including truss connections extending therealong and strut members engaging the truss connections and adjustable on the spars to positions adjacent to the several cross ribs as described.

2. An aeroplane wing structure including a series of cross ribs, longitudinal wing spars, apertured head plates rigidly secured on the spars adjacent to their opposite ends, flexible truss connections secured at one end through the apertures of one of the head plates and extending along the spars, spacing plates forming struts for the truss connections and shiftable along the spars to positions adjacent to the several ribs, and adjusting means to which the opposite ends of the truss connections are secured, including hub bolts engageable in the apertures of the other of the head plates as described.

JAMES VICTOR MAXWELL.
JOSEPH PAUL SEISER.

Witness:
FRED N. CLARK.